(12) United States Patent
Olson

(10) Patent No.: US 7,640,076 B2
(45) Date of Patent: Dec. 29, 2009

(54) REMOTE CONTROL ROVER CONFIGURED FOR VIEWING AND MANIPULATING OBJECTS

(76) Inventor: Bradley Darrel Olson, 707 Louisedale Dr., Fort Wayne, IN (US) 46808

( * ) Notice: Subject to any disclaimer, the term of this patent is extended or adjusted under 35 U.S.C. 154(b) by 922 days.

(21) Appl. No.: 10/977,745

(22) Filed: Oct. 29, 2004

(65) Prior Publication Data
US 2006/0095161 A1 May 4, 2006

(51) Int. Cl.
*G06F 19/00* (2006.01)

(52) U.S. Cl. ............................... 700/259; 700/245

(58) Field of Classification Search .......... 700/245–259
See application file for complete search history.

(56) References Cited

U.S. PATENT DOCUMENTS

| | | | | |
|---|---|---|---|---|
| 3,775,765 A | * | 11/1973 | Di Piazza et al. | 342/22 |
| 4,460,826 A | * | 7/1984 | Pryor | 250/227.2 |
| 4,621,562 A | * | 11/1986 | Carr et al. | 89/41.05 |
| 4,827,956 A | * | 5/1989 | Toot | 135/66 |
| 4,993,912 A | * | 2/1991 | King et al. | 414/729 |
| 5,219,264 A | * | 6/1993 | McClure et al. | 414/730 |
| 5,263,809 A | * | 11/1993 | Kent | 414/680 |
| 5,413,454 A | * | 5/1995 | Movsesian | 414/729 |
| 5,416,321 A | * | 5/1995 | Sebastian et al. | 250/288 |
| 5,550,953 A | * | 8/1996 | Seraji | 700/263 |
| 5,823,590 A | * | 10/1998 | Forrest et al. | 294/19.1 |
| 6,272,396 B1 | * | 8/2001 | Taitler | 700/245 |
| 6,292,713 B1 | * | 9/2001 | Jouppi et al. | 700/245 |
| 6,377,872 B1 | * | 4/2002 | Struckman | 700/258 |
| 6,450,557 B1 | * | 9/2002 | Martinez | 294/19.1 |
| 6,704,619 B1 | * | 3/2004 | Coleman et al. | 700/245 |
| 6,816,755 B2 | * | 11/2004 | Habibi et al. | 700/259 |
| 7,096,090 B1 | * | 8/2006 | Zweig | 700/245 |
| 7,174,238 B1 | * | 2/2007 | Zweig | 700/245 |
| 7,289,884 B1 | * | 10/2007 | Takahashi et al. | 700/245 |
| 7,363,844 B2 | * | 4/2008 | Barton | 86/50 |
| 7,415,321 B2 | * | 8/2008 | Okazaki et al. | 700/245 |
| 2005/0096792 A1 | * | 5/2005 | Watanabe et al. | 700/245 |
| 2006/0045679 A1 | * | 3/2006 | Ostendorff | 414/402 |
| 2006/0095161 A1 | * | 5/2006 | Olson | 700/259 |
| 2007/0039831 A1 | * | 2/2007 | Townsend | 205/324 |

* cited by examiner

*Primary Examiner*—Thomas G Black
*Assistant Examiner*—Wae Louie
(74) *Attorney, Agent, or Firm*—Raymond M. Galasso; Galasso & Associates, L.P.

(57) ABSTRACT

A remotely controlled roving vehicle comprises a claw assembly and a video camera. The claw assembly includes a main body and a plurality of grasping member. A first end of each one of the grasping members is movably mounted on the main body for enabling a second end of each one of the grasping members to be moved between an open position and a closed position. The video camera includes an image-receiving portion that is mounted on the main body. A second end of each one of the grasping members is within a field of view of the video camera. A lens of the video camera is centrally located with respect to the first ends of the grasping members. The first end of each one of the grasping members is pivotally mounted on the main body. The main body is rotatable about a longitudinal axis thereof.

15 Claims, 3 Drawing Sheets

REMOTE CONTROL ROVER CONFIGURED FOR VIEWING AND MANIPULATING OBJECTS

FIELD OF THE DISCLOSURE

The disclosures made herein relate generally to remote control rover systems and, more particularly, to remotely controlled roving vehicle configured for viewing and manipulating objects.

BACKGROUND

Quite often the need arises for placement of items in, retrieval of items from and manipulation of items within difficult to access locations and/or dangerous locations. Examples of such locations include fields of debris, underground cavities, pipes of systems, etc. Accordingly, in some cases, the physical location is the primary cause for such danger while in other cases it is the item being manipulated that is the primary cause for such danger.

Conventional approaches for such placement, retrieval and/or manipulation expose the item, the person and/or access equipment to a potentially dangerous situation. Additionally, such conventional approaches are sometimes limiting in that they do not provide sufficient equipment power (e.g., hydraulic power) at required distant locations. For example, some applications may require a magnitude of grasping force that is better achievable via hydraulic actuation as opposed to electrical actuation.

Therefore, a remotely controlled rover system that overcomes limitations and drawbacks associated with conventional rover systems and approaches for remotely facilitating placement, retrieval and/or manipulation of items would be useful, advantageous and novel.

SUMMARY OF THE DISCLOSURE

In one embodiment, a remotely controlled roving vehicle comprises a claw assembly and a video camera. The claw assembly includes a main body and a plurality of grasping members. A first end of each one of the grasping members is movably mounted on the main body for enabling a second end of each one of the grasping members to be moved between an open position and a closed position. An image-receiving portion of the video camera is mounted on the main body. The second end of each one of the grasping members is within a field of view of the video camera.

In another embodiment, a remotely controlled rover system comprises a remotely controlled roving vehicle and a control apparatus. The claw assembly includes a main body, a plurality of grasping members mounted on the main body and a video camera having an image-receiving portion thereof mounted on the main body. A first end of each one of the grasping members is movably mounted on the main body for enabling a second end of each one of the grasping members to be moved between an open position and a closed position. The second end of each one of the grasping members is within a field of view of the video camera. The control apparatus includes a video display, a user input device and a cable reel assembly having a length of cable provided thereon. The cable is connected to the roving vehicle for enabling signals to be transmitted between the control apparatus and the roving vehicle. The video display is coupled to the video camera through the cable for enabling images captured by the video camera to be visually displayed thereon. The user input device is coupled to the roving vehicle through the cable for enabling movement of the roving vehicle and actuation of the claw assembly to be selectively controlled.

In another embodiment, a remotely controlled rover system comprises a remotely controlled roving vehicle including a claw assembly and a control apparatus. The claw assembly includes a main body, a plurality of grasping members movably mounted on the main body and a video camera having an image-receiving portion thereof mounted on the main body. A first end of each one of the grasping members is movably mounted on the main body for enabling a second end of each one of the grasping members to be moved between an open position and a closed position. The second end of each one of the grasping members is within a field of view of the video camera. The control apparatus includes interconnect means coupled between the control apparatus and the roving vehicle for enabling interaction therebetween, visual display means and user input means. The visual display means is configured for enabling images captured by the video camera to be visually displayed. The user input means is configured for enabling movement of the roving vehicle and actuation of the claw assembly to be selectively controlled.

In operation, an operator use user input means (e.g., a keyboard, trackball, joystick and the like) and visual display (e.g., a video display that enables the camera's field of view to be displayed) for facilitating movement of the rover and actuation of the claw assembly. Through appropriate input commands, the rover is moved along a visually confirmed path (i.e., as visually confirmed via the video camera and video display) and the claw assembly is controlled for manipulating (i.e., grasping, ungrasping rotating, etc) a manipulated item.

Correspondingly, it is a principal object of the inventive disclosures made herein to provide remotely controlled rovers and systems that overcome limitations and drawbacks associated with conventional rovers, systems and approaches for remotely facilitating placement, retrieval and/or manipulation of items. Specifically, such rovers and systems dramatically reduce the dangers associated with placement, retrieval and/or manipulation of items in dangerous environments and/or situations. Additionally, such rovers and systems are advantageous in that they provide useful equipment power (e.g., hydraulic power) at required distant locations. For example, a hydraulic actuation of the claw assembly may be implemented for providing high clamping force capability.

Turning now to specific embodiments of the inventive disclosures made herein, in at least one embodiment of the inventive disclosures made herein, a video camera lens is centrally located with respect to the first ends of the grasping members.

In at least one embodiment of the inventive disclosures made herein, the first end of each one of the grasping members is pivotally mounted on the main body.

In at least one embodiment of the inventive disclosures made herein, the main body is rotatable about a longitudinal axis thereof.

In at least one embodiment of the inventive disclosures made herein, means for forcibly moving the grasping members between the open position and the closed position is provided.

In at least one embodiment of the inventive disclosures made herein, the means for forcibly moving includes at least one of hydraulic means and electrical means.

In at least one embodiment of the inventive disclosures made herein, the plurality of grasping members includes a first pair of grasping members and a second pair of grasping members and the first pair of grasping members is different in configuration than the second pair of grasping members.

In at least one embodiment of the inventive disclosures made herein, a first pair of grasping members is of a first size and a second pair of grasping members is of a second size In at least one embodiment of the inventive disclosures made herein, the interconnect means includes a reel having a length of cable provided thereon.

In at least one embodiment of the inventive disclosures made herein, means is provided for rotating the reel for enabling the cable to be extending and retracting dependent upon the movement of the roving vehicle.

In at least one embodiment of the inventive disclosures made herein, the visual display means includes a visual display.

In at least one embodiment of the inventive disclosures made herein, the user input means includes a non-keyed user device such as a joystick or trackball.

In at least one embodiment of the inventive disclosures made herein, the roving vehicle includes a chassis and the claw assembly is translatably attached to the chassis.

These and other objects and embodiments of the inventive disclosures made herein will become readily apparent upon further review of the following specification and associated drawings.

DETAILED DESCRIPTION OF THE DRAWINGS

Figure 1:
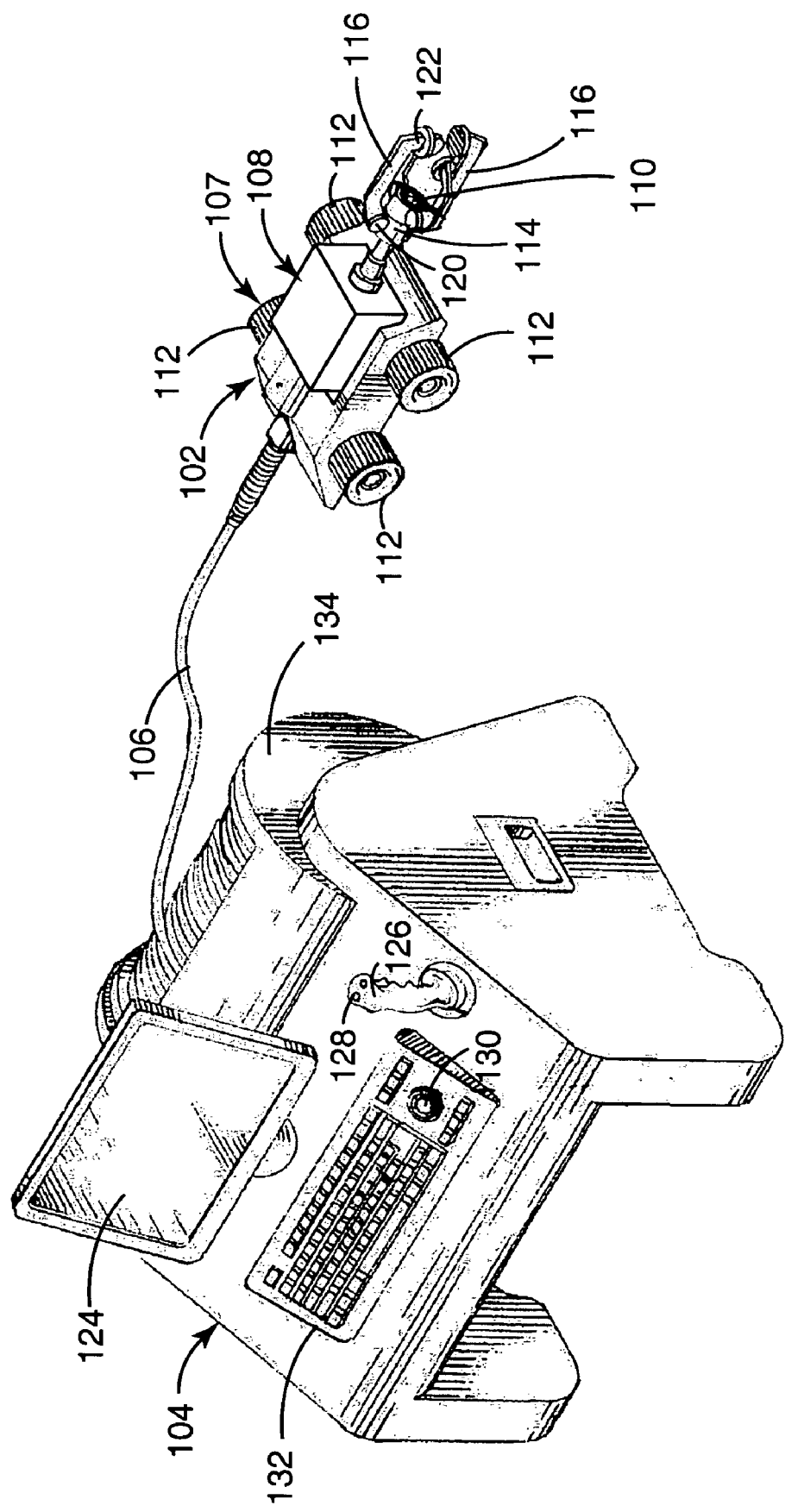
FIG. 1 depicts an embodiment of a remotely controlled rover system in accordance with the inventive disclosures made herein.

FIG. 1 depicts an embodiment of a remotely controlled rover system 100 in accordance with the inventive disclosures made herein. The remotely controlled rover system 100 includes a remotely controlled roving vehicle 102 (i.e., the roving vehicle 102) and a control apparatus 104. The roving vehicle 102 is operably connected to the control apparatus 104 by a cable 106.

The roving vehicle 102 includes means for movement 107, a claw assembly 108 and a video camera 110. Functionally, the drive means and the steering means enable selective movement of the roving vehicle 102 between locations as directed by a remote operator. As depicted, one embodiment of the means for movement 107 includes a plurality of wheels 112 and is configured in a manner wherein one or more of the wheels 112 is connected to a drive means and a steering means (not specifically shown). Examples of the drive means include an electric motor, a hydraulic motor and the like. Examples of the steering means include a rack/pinion/servo arrangement, a spindle/servo arrangement, a dual transmission/clutch arrangement and the like. Such examples of the steering means allow for turning of at least one of the wheels 112 or turning through differential speed of two or more of the wheels 112. Other embodiments of the means for movement include one or more tracks and a mechanism allowing for differentiation speed of one or more of the tracks.

The claw assembly 108 includes a main body 114 and a plurality of grasping members 116 and a video camera 110. The plurality of grasping members 116 is movably mounted on the main body 114. In the depicted embodiment, a first end 120 of each one of the grasping members 116 is pivotally mounted (i.e., movable mounted) on the main body 114. Through such pivoting ability, a second end 122 of each one of the grasping members 116 is movable between a position in which an item is released from the grasping members 116 (i.e., a respective open position) and a position in which one or more of the grasping members 116 are engaged with the item (i.e., a respective closed position).

It is disclosed herein that a various embodiments of means for forcibly moving the grasping members 116 between the open position and the closed position may be implemented. In one embodiment, a means for forcibly moving is a hydraulic-type means that includes components such as a hydraulic pump, a reservoir for hydraulic oil, a hydraulic actuators and other associated components such as hydraulic lines, valves pressure regulators, etc. The hydraulic means may be entirely located on the roving vehicle 102 (e.g., hydraulic fluid/hydraulic pressure is not communicated through the cable 106) or may be segmented between the roving vehicle 102 and the control apparatus 104 (e.g., the pump is located at the control apparatus 104 and hydraulic fluid/fluid pressure is communicated through the cable 106). In another embodiment, the means for forcibly moving is an electro-mechanical type means that includes components such as electrical solenoids, cams, levers, and the like connected to the grasping members 116.

The video camera 110 is attached to the roving vehicle 102 in a manner wherein the second end 122 of each one of the grasping members 116 is within a field of view of the video camera 110. In one embodiment, an image-receiving portion of the video camera 110 includes a lens and light receptor circuitry and is mounted on the main body 114 of the claw assembly 108. To provide for the second end 122 of each one of the grasping members 116 to be within the field of view of the video camera 110, the lens of the video camera 110 is preferably, but not essentially, centrally located on the main body 114 with respect to the first ends 120 of the grasping members 116.

In one embodiment, the claw assembly 108 is preferably configured for enabling translation of the claw assembly 102 with respect to a chassis (not specifically shown) of the roving vehicle 102. For example, the claw assembly 102 is mounted on the chassis via means for enabling translation of the claw assembly with respect to the chassis. Such translation includes vertical translation, horizontal translation and/or longitudinal translation. Examples of the means for movement include a plurality of sliders mounted between the chassis and the claw assembly 102 and an actuation means such as a hydraulic actuation means or an electro-mechanical actuation means.

Figure 2:
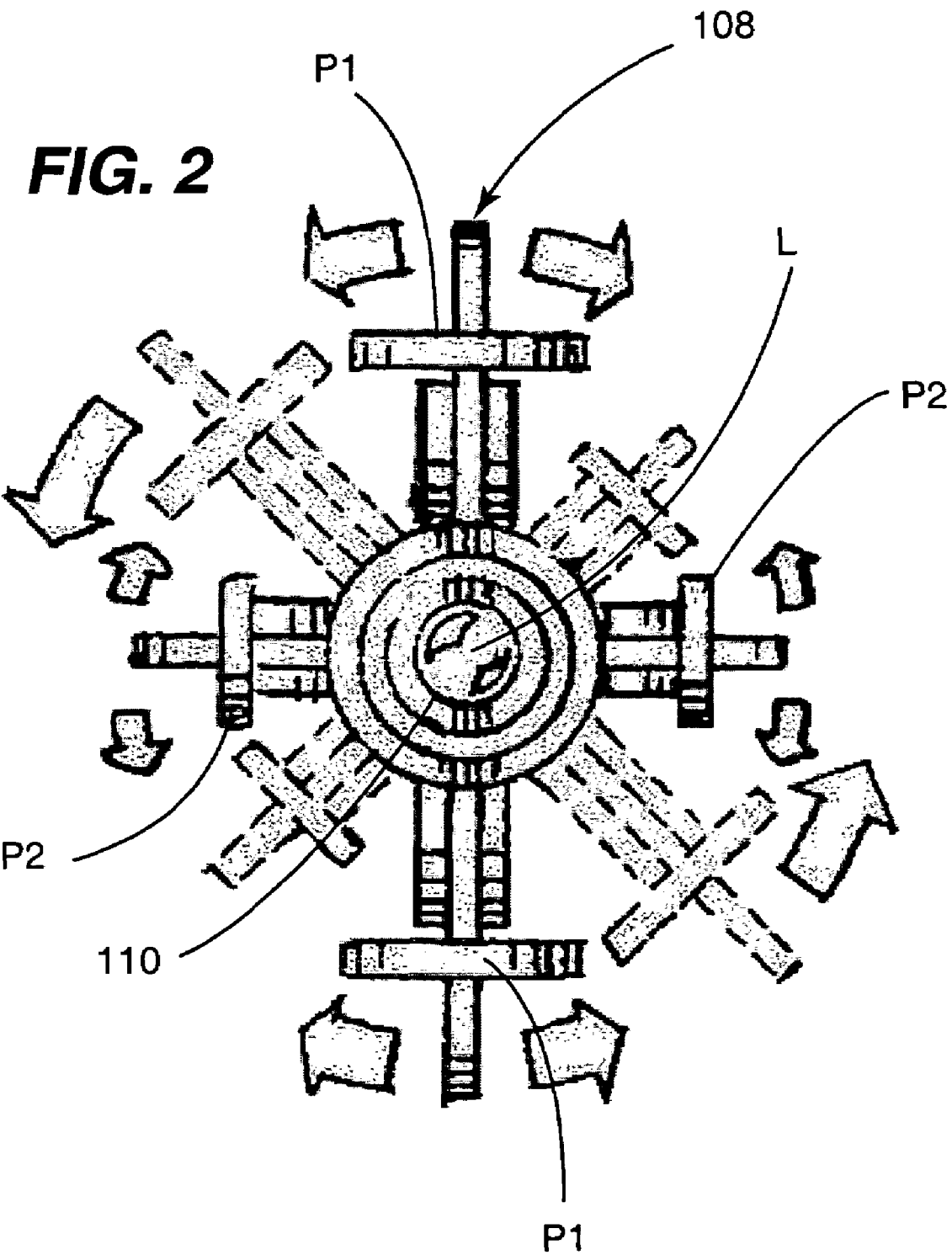
FIG. 2 depicts an embodiment of a claw assembly in accordance with the inventive disclosures made herein.

As depicted in FIG. 2, the claw assembly 108 is rotatable about a longitudinal reference axis L (e.g., the longitudinal axis of the main body 114 and/or camera lens). Additionally, the plurality of grasping members 116 includes a first pair P1 of grasping members and a second pair P2 of grasping members. In one embodiment, the first pair P1 of grasping members is different in configuration than the second pair P2 of grasping members. Examples of such difference in configuration include, but are not limited to, size, shape, material, clamping strength, etc.

Figure 3:
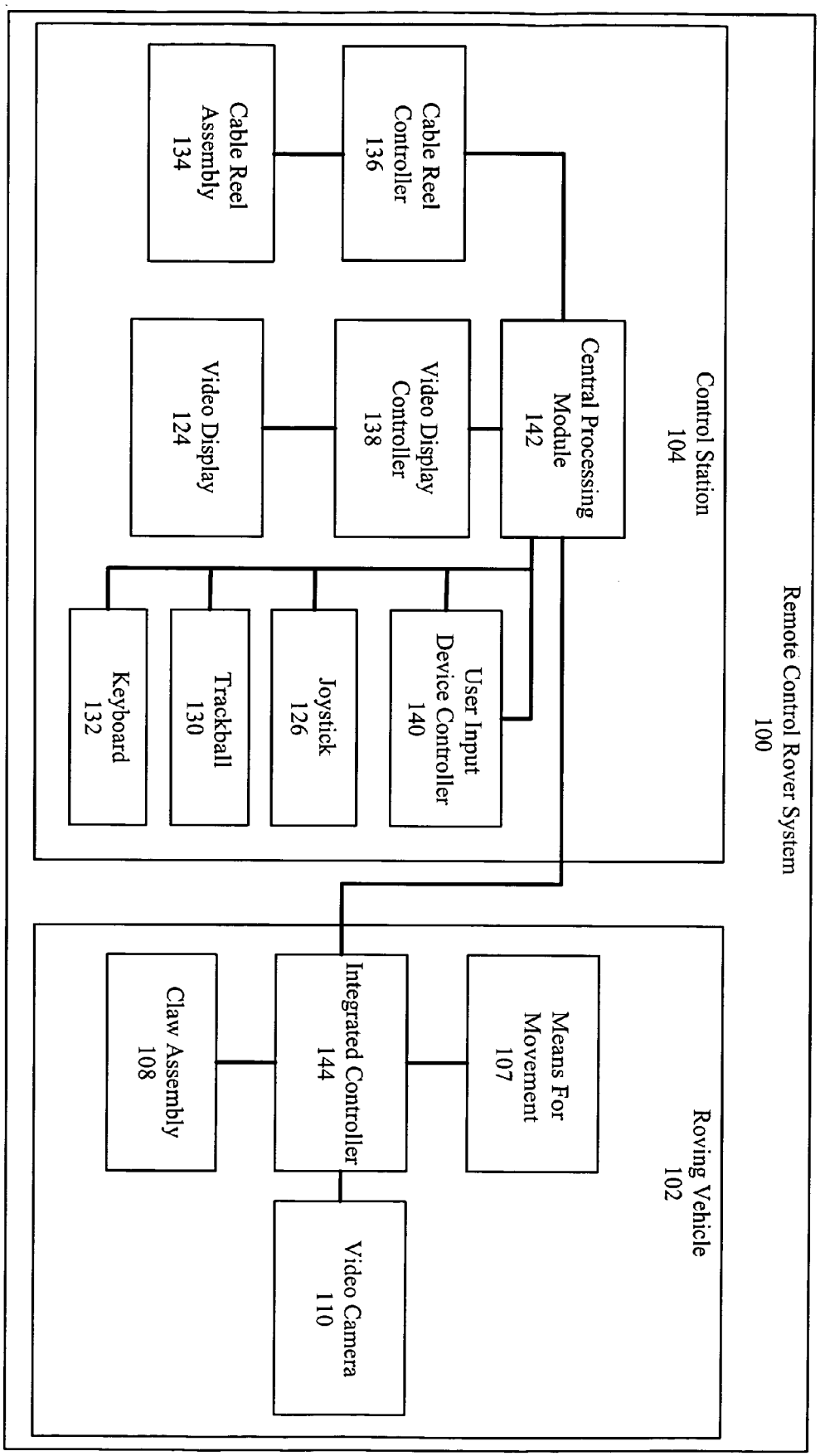
FIG. 3 depicts an embodiment of a system component schematic of the rover system depicted in FIG. 1.

Referring now to FIGS. 1 and 3, the control apparatus 104 is configured for controlling movement of the roving vehicle 102, movement of the claw assembly 108 and, optionally, adjustment of the relative field of view of the video 110. The control apparatus 104 includes a video display 124, a plurality of user input devices (i.e., a joystick 126 having a plurality of actuation buttons 128, a trackball 130, a keyboard 132), a cable reel assembly 134 and various logic components. The joystick 126 and the trackball 130 are examples of non-keyed user input devices.

The cable reel assembly 134 has a length of the cable 106 provided thereon. The cable 106 is connected to the roving vehicle 102 for enabling signals to be transmitted between the control apparatus 104 and the roving vehicle 102. The video display 124 is connected to the video camera 110 through the cable 106 for enabling images captured by the video camera 110 to be visually displayed. The user input devices are connected to the roving vehicle 102 through the cable for enabling movement of the roving vehicle 102 and actuation of the claw assembly 108 to be selectively controlled. In one embodiment, a means for rotating the reel (e.g., a motor assembly) is provided for enabling the cable 106 to be extending and retracting dependent upon movement of the roving vehicle 102.

The various logic components of the control apparatus 104 facilitate system functionality such as signal interfacing between the roving vehicle 102 and the control apparatus 104, cable reel control, displaying of video signals generated by the video camera 110, and processing of inputs made by the user via the user interface devices. As depicted in FIG. 3, one embodiment of the various logic components of the control apparatus 104 include a cable reel controller 136, a video controller 138, a user input device controller 140 and a central processing module 142. The central processing module 142 is connected between the rover vehicle 102, the cable reel controller 136, the video controller 138 and the user input device controller 140 and facilitates processing of input and output information (e.g., identification, processing, interpretation and/or transmission signals).

The roving vehicle 102 includes an integrated controller 144 connected to the means for movement 107, the claw assembly 108 and the video camera 110. The integrated controller 144 is further connected to the control apparatus 104 through the central processing module 142. The integrated controller 144 facilitates rover-based information processing functionality associated with camera operation, claw assembly operation, roving vehicle movement and signal transmission between the roving vehicle 102 and the control apparatus 104.

In another embodiment of the rover system 100 (not specifically shown), remote control functionality is facilitated in a wireless manner wherein the control apparatus 104 and the roving system 102 include respective transceivers this manner, signals may be transmitted between the control apparatus 104 and the roving vehicle 102.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice embodiments of the inventive disclosures made herein. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A remotely controlled roving vehicle, comprising:
   a plurality of wheels connected to a drive means and a steering means;
   a control apparatus;
   a cable, wherein said cable is operably connected to the control apparatus and the roving vehicle;
   a claw assembly including a main body and a plurality of grasping members, wherein a first end of each one of said grasping members is movably mounted on the main body for enabling a second end of each one of said grasping members to be moved between an open position and a closed position; said the plurality of grasping members includes a first pair of grasping members and a second pair of grasping members said first pair of grasping members being different in configuration than the second pair of grasping members; and
   a video camera having an image-receiving portion thereof mounted on the main body, wherein the second end of each one of said grasping members is within a field of view of the video camera; and wherein the lens of the video camera is centrally located with respect to the first ends of said grasping members.

2. The roving vehicle of claim 1 wherein:
   the roving vehicle includes a chassis; and
   the claw assembly is translatable attached to the chassis.

3. The roving vehicle of claim 1 wherein the first end of each one of said grasping members is pivotally mounted on the main body.

4. The roving vehicle of claim 1 wherein the main body is rotatable about a longitudinal axis thereof.

5. The roving vehicle of claim 1, further comprising:
   means for forcibly moving said grasping members between the open position and the closed position.

6. The roving vehicle of claim 5 wherein said means for forcibly moving includes at least one of hydraulic means and electrical means.

7. The roving vehicle of claim 1, further comprising:
   means for forcibly moving said grasping members between the open position and the closed position;
   wherein a lens of the video camera is centrally located with respect to the first ends of said grasping members;
   wherein the first end of each one of said grasping members is pivotally mounted on the main body;
   wherein the main body is rotatable about a longitudinal axis there;
   wherein said means for forcibly moving includes at least one of hydraulic means and electrical means;
   wherein the plurality of grasping members includes a first pair of grasping members and a second pair of grasping members;
   wherein the first pair of grasping members is different in configuration than the second pair of grasping members;
   wherein the roving vehicle includes a chassis; and
   wherein the claw assembly is translatable attached to the chassis.

8. A remote control rover system, comprising:
   a plurality of wheels connected to a drive means and a steering means;
   a remotely controlled roving vehicle including a claw assembly having a main body, a plurality of grasping members movably mounted on the main body wherein said the plurality of grasping members includes a first pair of grasping members and a second pair of grasping members; said first pair of grasping members is different in configuration than the second pair of grasping members and a video camera having an image-receiving portion thereof mounted on the main body, wherein a first end of each one of said grasping members is movably mounted on the main body for enabling a second end of each one of said grasping members to be moved between an open position and a closed position and wherein the second end of each one of said grasping members is within a field of view of the video camera; wherein a lens of the video camera is centrally located with respect to the first ends of said grasping members; and a control apparatus including a video display, one or more user input devices comprised or one or more of a joystick having a plurality of actuation buttons, a trackball or a keyboard and a cable reel assembly having a length of cable provided thereon, wherein said cable is connected to the roving vehicle for enabling signals to be transmitted between the control apparatus and the roving vehicle, wherein the video display is coupled to the video camera through said cable for enabling images captured by the video camera to be visually displayed thereon, and wherein said at least one user input device is coupled to the roving vehicle through said cable for enabling movement of the roving vehicle and actuation of the claw assembly to be selectively controlled.

9. The system of claim 8 wherein the control apparatus and the roving vehicle jointly include means for forcibly moving said grasping members between the open position and the closed position.

10. The system of claim 9 wherein said means for forcibly moving includes at least one of hydraulic means and electrical means.

11. The system of claim 8, further comprising:
means for rotating the reel for enabling said cable to be extended and retracting dependent upon said movement of the roving vehicle;
wherein the control apparatus and the roving vehicle jointly include means for forcibly moving said grasping members between the open position and the closed position;
wherein a lens for the video camera is centrally located with respect to the first ends of said grasping members;
wherein the first end of each one of said grasping members is pivotally mounted on the main body;
wherein said means for forcibly moving includes at least one of hydraulic means and electrical means;
wherein the plurality of grasping members includes a first pair of grasping members and a second pair of grasping members; and
wherein the first pair of grasping members is different in configuration than the second pair of grasping members.

12. A remote control rover system, comprising:
a remotely controlled roving vehicle including a claw assembly having a main body, a plurality of grasping members movably mounted on the main body said plurality of grasping members includes a first pair of grasping members and a second pair of grasping members; wherein said first pair of grasping members is different in configuration than the second pair of grasping members and a video camera having an image-receiving portion thereof mounted on the main body, wherein a first end of each one of said grasping members is movably mounted on the main body for enabling a second end of each one of said grasping members to be moved between an open position and a closed position and wherein the second end of each one of said grasping members is within a field of view of the video camera;

a control apparatus including interconnect means coupled between the control apparatus and the roving vehicle for enabling interaction there between, visual display means and user input means, wherein said visual display means is configured for enabling images captured by the video camera to be visually displayed, and wherein said user input means is configured for enabling movement of the roving vehicle and actuation of the claw assembly to be selectively controlled; and a plurality of user input devices comprised of a joystick having a plurality of actuation buttons, a trackball and a keyboard.

13. The system of claim 12 wherein:
a lens of the video camera is centrally located with respect to the first ends of said grasping members.

14. The system of claim 12 wherein: the control apparatus and the roving vehicle jointly include means for forcibly moving said grasping members between the open position and the closed position; and said means for forcibly moving includes at least one of hydraulic means and electrical means.

15. The system of claim 14, wherein:
said interconnect means includes a reel having a length of cable provided thereon and means for rotating the reel for enabling said cable to be extending and retracting dependent upon said movement of the roving vehicle; and
said visual display means includes a visual display.

* * * * *